United States Patent
Sorsa

(10) Patent No.: US 7,277,408 B2
(45) Date of Patent: Oct. 2, 2007

(54) SHARED APPLICATION ACCESS FOR DATA SERVICES IN WIRELESS TELECOMMUNICATION SYSTEMS

(75) Inventor: Mika T. Sorsa, Helsinki (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 10/290,510

(22) Filed: Nov. 8, 2002

(65) Prior Publication Data
US 2003/0156591 A1 Aug. 21, 2003

Related U.S. Application Data

(63) Continuation of application No. PCT/FI01/00388, filed on Apr. 20, 2001.

(30) Foreign Application Priority Data
May 8, 2000 (FI) .................................. 20001078

(51) Int. Cl.
*H04Q 7/00* (2006.01)
(52) U.S. Cl. ...................... 370/328; 370/338; 370/401; 709/227
(58) Field of Classification Search ...................... None
See application file for complete search history.

(56) References Cited

U.S. PATENT DOCUMENTS

| | | | |
|---|---|---|---|
| 5,712,906 A | 1/1998 | Grady et al. | 379/93.17 |
| 5,812,930 A | 9/1998 | Zavrel | 455/5.1 |
| 5,951,643 A * | 9/1999 | Shelton et al. | 709/227 |
| 6,119,166 A | 9/2000 | Bergman et al. | 709/232 |
| 6,144,991 A | 11/2000 | England | 709/205 |
| 6,336,137 B1 * | 1/2002 | Lee et al. | 709/219 |
| 6,748,420 B1 * | 6/2004 | Quatrano et al. | 709/205 |
| 6,754,693 B1 * | 6/2004 | Roberts et al. | 709/205 |
| 6,883,015 B1 * | 4/2005 | Geen et al. | 709/203 |
| 2002/0073155 A1 * | 6/2002 | Anupam et al. | 709/205 |

FOREIGN PATENT DOCUMENTS

| | | |
|---|---|---|
| WO | 99/18514 | 4/1999 |
| WO | 99/40551 | 8/1999 |
| WO | 01/20844 | 9/2000 |

OTHER PUBLICATIONS

Nokia IPR-osasto, 20001078, /JTB, RF/27393 FI, Dec. 27, 2001.
Nokia IPR-osato, 20001078, /JTB, RF/27393 FI, Dec. 7, 2002.
International Search Report.

* cited by examiner

*Primary Examiner*—Chi Pham
*Assistant Examiner*—Anh-Vu Ly
(74) *Attorney, Agent, or Firm*—Foley & Lardner LLP

(57) ABSTRACT

A method and system for providing multi-user shared access to service applications operating in wireless data services such as Wireless Application Protocol (WAP) is described. An exemplary embodiment of the present invention comprises a solution that provides a modified communication pathway that permits mobile clients to join an active session engaged by other clients. The system comprises a gateway 200 and a coordinating browser 206 (co-browser) which cooperates with the gateway subsystem 202 and the WAP subsystem 204 to coordinate and establish shared sessions between users. When a first client 220 is engaged in an active session, the co-browser 206 determines that a second client 230 wishes to join the session by analyzing the request containing the universal resource identifier (URI) transmitted by the second client. The co-browser enables all peer clients to interact, share, and view updated content within the application.

13 Claims, 7 Drawing Sheets

SHARED APPLICATION ACCESS FOR DATA SERVICES IN WIRELESS TELECOMMUNICATION SYSTEMS

This application is a continuation of pending international application No. PCT/FI01/00388, filed Apr. 20, 2001.

FIELD OF INVENTION

The present invention relates generally to wireless telecommunication systems and, more particularly, to a method and system for providing multi-user shared sessions among users of wireless data services.

BACKGROUND OF THE INVENTION

User applications have long been used in the field of computers. As the use of applications has proliferated, it has become advantageous to store information in standardized formats so that it can be accessed and shared among many people that use a common computing platform. This is particularly important in e.g. large organisations where perhaps many hundreds of employees may need to have access to work done by others in the organisation. Standardising work on a common platform makes application sharing possible which can vastly reduce the time the work spends in transit before getting to the necessary employees. By way of example, a typical company may have a product development organisation comprising a number of departments, each responsible for designing a specific portion of the product using a CAD tool, for example. It is often the case that the departments must work closely together to ensure that the designed portions work properly when the final product is assembled. During the design process the product designers benefit greatly from application sharing i.e. the efficient exchange of CAD files especially when the design groups are located in different geographical locations as is the case in many multi-national companies.

The emergence of computer networks, such as local area networks (LANs), wide area networks (WLANs), Intranet and Internet connections etc., has facilitated the use of shared applications in many organisations. The proliferation of networks has shown to be an especially suitable vehicle for implementing multi-user systems that enable users to share applications in real-time. Interactive multi-user systems such as e.g. Microsoft Netmeeting™ allow workgroups to share a plurality of applications through the network in substantially real-time. This is exemplified in Netmeeting™, for example, in a "white board" function where all users connected to the session are able to view the contents on the "white board" and perhaps make changes to the contents for all others to see. The function is intended to simulate a chalkboard used in a classroom except that it is applied to a multi-user computer networking environment but having the significant advantage in that the users can be located in various locations and at perhaps great distances from each other. Although clients running programs such as Netmeeting™ can share an arbitrary application such as a database, common window ("white board"), or a Web browser, a disadvantage is that it requires system specific software to be installed and maintained in all client machines.

Application sharing is typically performed via a master host having the actual execution content located thereon whereby multiple users interact through a local user interface replica which are able to access a data repository located on the master host. Similar sharing techniques are used in other specialised solutions such as E-mail and calendar systems such as Lotus Notes™ and Microsoft Exchange™, for example. A further example can be found in multi-user games played over a network or the Internet that have become increasingly popular. Gaming applications generally operate under a common game server that updates the game model based on the interactions with several players that use game clients to communicate with the game server. The game server in particular illustrates a specialised multi-user model that is interactive, and where the game actions such as player movement, shooting etc. comprise specific control instructions and are interpreted by the game server. One disadvantage of de facto multi-user solutions is that they are often implemented as proprietary applications e.g. E-mail, interactive games etc. Thus sharing user access to other applications within the same implementation is typically not possible. Furthermore, specific software support is generally required in all client machines thereby restricting access to those machines having the required software.

In the field of mobile telephony, access to wireless applications by mobile devices via data services have been promoted through communication protocols such as Wireless Application Protocol (WAP). WAP is an open standard for mobile devices that is similar in operation to the well-known Internet technology but is optimized specifically to meet the limited bandwidth constraints of the wireless environment. This is achieved, among other things, by using binary data transmission to optimize for long latency and low bandwidth in the form of Wireless Markup Language (WML) and WML script. WML and WML script are optimized for use in hand-held mobile terminals for producing and viewing WAP content and are analogous to the hypertext markup language (HTML) and HTML script used for producing and displaying content on the WWW. It should be noted that the term mobile devices referred to herein may include any portable device capable of wireless communication such as e.g. mobile phones, handheld devices such as personal digital assistants (PDAs), and communicator devices such as the Nokia 9110 etc.

FIG. 1 shows the basic architecture of a typical WAP service model which allows content to be hosted on WWW origin servers or WAP servers and available for wireless retrieval. By way of example, a WAP compliant phone 100 containing a relatively simple built-in micro-browser is able to access the content in an application, such as that residing on the Internet, via a WAP gateway 111 installed in a mobile phone network, for example. To access content from the WWW, a WAP client 100 may make a WML request 113 to the WAP gateway 111 by specifying an uniform resource locator (URL) via transmission 114 on an Internet origin server 112. A URL uniquely identifies a resource, e.g., a document on an Internet server that can be retrieved by standard Internet protocols. The WAP gateway 111 then retrieves the content from the server 112 via transmission 115 that is preferably prepared in WML format, which is optimized for use with WAP phones. If the content is only available in WML format, the WAP gateway 111 may attempt to translate it into WML, which is then sent on to the WAP client 100 via wireless transmission 116 in such way that it is independent of the mobile operating standard For a more complete description of WAP architecture and the WAP environment the interested reader may refer to "Wireless Application Protocol Architecture Specification", WAP Forum, Apr. 30, 1998. URL: http://www.wapforum.org/ and "Wireless Application Protocol: Wireless Application Environment Overview", Version 04-Nov-1999, WAP Forum.

A disadvantage with prior art wireless access solutions is that they do not provide a way to collaborate and share arbittary applications e.g., by providing multi-user access to "Web" applications, i.e. a service that is written in a standard markup language and intended for customer use with a client browser. As an illustration, a WAP client customer that wishes to access a travel agency service for booking airline tickets makes a wireless connection to a server containing the relevant databases. In this scenario the travel agent is not able to simultaneously assist the customer by, for example, sifting through possible alternatives. In contrast, in the computer networking paradigm a "sharing-like" session can be achieved by a network administrator who has the capability to view the screen contents of and interact in real-time with any computer workstation in the network. This is particularly helpful when the user needs assistance, for example, when the user is experiencing some sort of computer problem or needs help using a particular application. Thus immediate assistance can be administered conveniently and efficiently to those who need it. This feature is currently lacking in the mobile environment where access to data services via wireless connections such as WAP could especially benefit from real-time help facilities. This is because WAP users must navigate through pages of condensed content designed to be viewed on the relatively small displays of mobile devices and thus may present a less intuitive experience when compared to browsing with a desktop computer.

In view of the foregoing, it would be desirable to provide a technique for providing multi-user interactive access to arbitrary shared applications in wireless environments such as WAP. It would be further advantageous if the technique does not require significant additional specialised software support in client mobile devices which may substantially raise costs.

SUMMARY OF THE INVENTION

Briefly described and in accordance with an embodiment thereof, the invention provides a common framework for shared use of arbitrary applications whereby in a method aspect of the invention, there is provided a wireless telecommunication system capable of providing data services to a plurality of mobile clients, wherein said system comprises a gateway and a cooperating coordinating browser, a method of establishing a shared session within a service application comprising the steps of:

establishing an active session with a first client;

transmitting a request from a second client to the gateway, wherein the second client requesting to join the active session;

analyzing said request from the second client by the coordinating browser;

joining the second client into the active session with the first client and delivering the current context of the active session to the second client; and delivering updated context to all clients thereby establishing an interactive shared session.

In an apparatus aspect of the invention, a wireless telecommunication system capable of providing data services residing on host servers to a plurality of mobile clients, wherein the wireless telecommunication system comprises a gateway for having wireless communication with said mobile clients, Characterised in that the system comprises a coordinating browser functioning together with said gateway, wherein the browser being configured for establishing a shared session between at least two of said mobile clients for use in interacting within a service application, and wherein updated context by any mobile client can be delivered to all mobile clients in the shared session.

In another aspect of the invention, there is provided a computer program product comprising:

computer executable program means for causing a wireless telecommunication gateway to provide wireless data services to a plurality of mobile clients; and computer executable program means for causing said gateway to operate together with a coordinating browser (206) to establish a shared session between at least two of said mobile clients within a service application, and wherein updated context by any mobile client can be delivered to all mobile clients in the shared session.

In still another aspect of the invention, there is provided a wireless gateway operating together with a wireless telecommunication system in order to provide wireless data services to a plurality of mobile clients, Characterised in that the gateway comprises a coordinating browser which cooperates to establish a shared session between at least two mobile clients within a wireless service application, and wherein updated context by any mobile client can be delivered to all mobile clients in the shared session.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

As put forth by an embodiment of the present invention, a technique for multi-user application sharing for use in wireless telecommunication systems operating in accordance with Wireless Application Protocol (WAP) is described. The embodiment comprises a solution that provides a modified communication pathway that permits clients to join an active session engaged by another client. The embodiment includes a WAP coordinating browser, hereinafter referred to as WAP co-browser, which is primarily implemented in software to functionally mediate between various client terminal user agents in order to negotiate access to a common application having content that may be hosted on a WAP gateway server or an Internet server.

Figure 1:
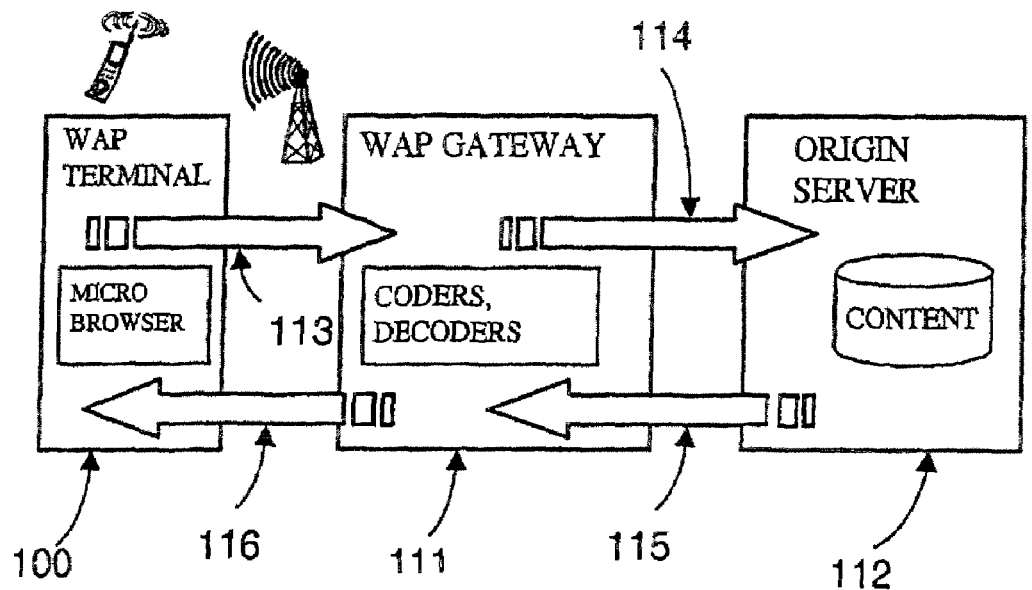
FIG. 1 is an illustration of a typical WAP service model.
Figure 2:
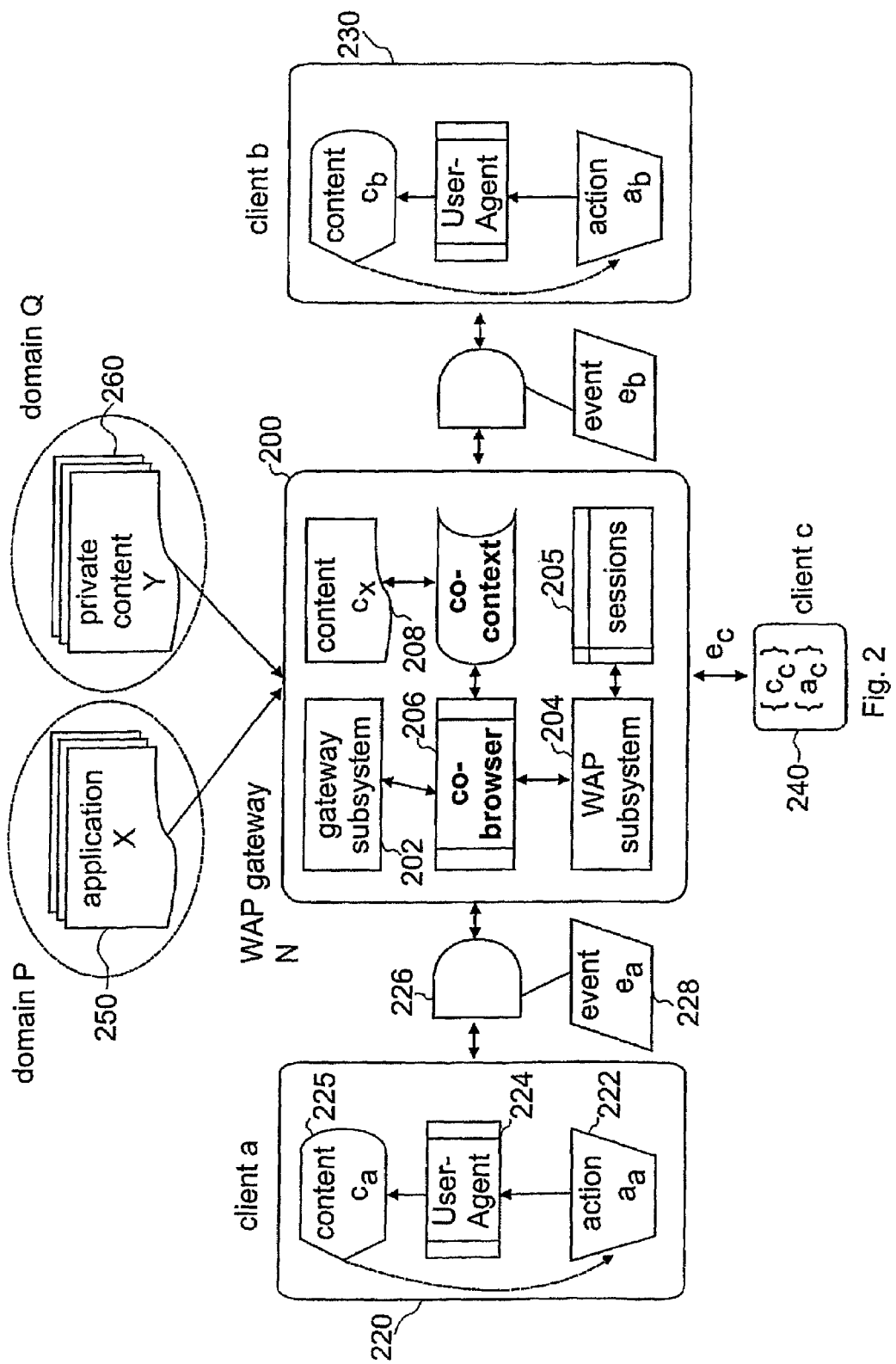
FIG. 2 shows a functional block diagram of a preferred embodiment described together with a WAP gateway server.

FIG. 2 shows a functional block diagram of the embodiment described together with a WAP gateway. In the embodiment, an individual user of WAP compliant mobile device is able to retrieve WAP content and access service applications in a similar manner to the standard WAP configuration described previously. As shown, a central component of the invention is the WAP gateway 200 which is shown in a simplified depiction with relevant functional components e.g. a gateway subsystem 202 directs the corresponding respond messages to a coordinating browser 206, a WAP subsystem 204 for directing requests to the coordinating browser, and the coordinating browser 206 (hereinafter referred to as co-browser) which delivers the requests to the gateway subsystem 202 for use in directing access to specified applications.

The gateway subsystem described herein relates to what is generally described in the Wireless Application Environment Overview, ch. 7.5 "WML and WMLScript Exchanges", which shows a subsystem that has the role of exchanging the content, such as WML. In practice this component could be a HTTP 1.1 (RFC2068) compliant software that is capable of retrieving content from a source specified in a WAP or a Wireless Session Protocol (WSP) request message which is received by the WAP subsystem 204. Also associated with the WAP subsystem 204 are WSP sessions (represented in block 205) which are maintained by a Session Management Entity that conforms to relevant WAP specifications such as the Wireless Session Protocol specification, but are otherwise implementation specific. In the present embodiment, the WAP subsystem 204 takes on the role of controlling the Session Management Entity i.e. the WSP session 205. A more detailed discussion of the role of the Session Management Entity can be found in the Wireless Session Protocol (WSP) specification and the Wireless Application Environment (WAE) specification.

Mobile users using a WAP compliant device, represented e.g. in FIG. 2 as client A 220, client B 230, and client C 240, communicate wirelessly with the WAP gateway 200 in order to access, for example, a service application X 250 shown to reside in arbitrary domain P or private content 260 residing in arbitrary domain Q in the case of restricted access. By way of example, when client A 220 desires to establish an active session with application X 250, client A 220 initiates an action $a_a$ 222 which is executed by a WAP User Agent 224 in the device whereby a request is generated that includes a universal resource locator (URL) pointing to specific application for transmission to the gateway 200. For transmission, the User Agent 224 uses e.g. WSP requests such as "get" and "post" represented by Event $e_a$ 228 via transmission path 226 in accordance with standard WAP protocols. At gateway 200, the request is received by co-browser 206 for (analysis) and routed in accordance with standard WAP procedures through the gateway subsystem 202 for connection with application X 250. The response obtained from the application is delivered by the gateway to the client which includes content $c_a$ 225 which is subsequently displayed on the mobile device.

Content $c_a$ 225 is typically received in the form of WML decks that are suitable for viewing on the relatively small display of a mobile device. The presentation of information sent to the mobile device is typically performed by a using a system known as decks and cards. As known by those skilled in the art, a deck is used metaphorically to represent a service which the user accesses. The service can be further made up of plurality of WML decks and cards that represent units for displaying information and for user response. This approach is designed to ensure that a suitable amount of information is presented to the user in an orderly fashion and to simplify navigation through the application.

In the event that another user such as client B 230 wishes to share an application already in use by client A 220, the co-browser 206 detects this and facilitates the joining of client B 230 to the engaged session. One possible way of providing sharing functionality is to use a so-called uniform resource identifier (URI) scheme to the co-browser service access point with the rest of the URI used to redirect and point to the desired location. As an illustration, an URI is a character string that typically starts with a scheme identifier, such as "http:", which determines the interpretation of the rest of the string. The URI is a generally well known standard that allows for manifestations of different schemes to achieve a specific purpose; and wherein it is applied to the present embodiment such that the co-browser activated in a similar way as e.g. the "mailto:" scheme is applied to activating e-mail service in a Web page. By way of example, the WAP subsystem 204 intercepts the URI transmitted e.g. by client B 230 and redirects the co-browser 206 for forthcoming transactions based on the session information. For example, a possible URI could be as follows:

share:http://www.nokia.com/catch-the-road-runner/ where the "share:" scheme indicates to the co-browser 206 that the client will be sharing and interacting within application with other clients. The co-browser 206 then continues to route the request using the established procedure until a current copy of the content provided from application X 250 is displayed as content $c_b$ on client B's mobile terminal 230. The same procedure is performed for additional clients i.e. client C 240 and so on for those wishing to join an engaged session. Theoretically there need not be a limit to the number of clients joining a session upon which all would receive a copy of the current content state at the time of joining. In addition to joining other options include e.g. clients being allowed to suspend a shared service session, resume the shared session, and of course terminate willingly or be ejected from the shared session.

When the content is updated in application X 250 by a client, such as client A 220 for example, all the other clients sharing the application receive the updated content i.e. the content provided from application X resulting from the update. When the content is updated a current copy is maintained in content $c_x$ 208 in the gateway 200 for each shared session. Content $c_x$ may store content from, but not necessarily, the most recent response message for example which may be retrieved from a local cache memory (not shown). Furthermore, the stored requests may be used to monitor conflicting client actions such as concurrent requests. The stored requests are also used to synchronize clients if it becomes necessary, such as when inactive clients attempt to resume their sessions. It should be noted that resuming clients may also choose to update the current context with a URL or with 'post'-ed content that is obtained from a distinct activity in another domain, for example. By way of illustration, a salesperson may interact with a customer in a business deal through a wireless house trade service with possibly several parties involved. The salesperson wants to prepare an offer for the customer, but in order to do so the salesperson needs to:

1.) access an intranet application running in their office; with this application the salesperson produces content that prescribes the offer; and wherein the customer and other unauthorized users cannot access the application and any confidential information accessible through it.

2.) deliver an appropriate link to the customer so that he/she may access the offer. Since the offer was dynamically created, it was not possible to include it in the content that the client was currently viewing at the time. Given the above scenario, the salesperson utilizes the resume feature in order to update the share content including the dynamic link URI, or alternatively, post the entire (dynamic) content to the client involved in a shared session. As an alternative solution, WAP Push protocols (Service Indication or Service Load) could be also used to automatically "push" content onto the customer device. The WAP Push protocols are described in more detail in the WAP Push Architectural Overview, Version 08-Nov-1999, Wireless Application Protocol Forum, 1999. URL: http://www.wapforum.org. It should be noted however that the invention is not restricted to operating with specific procedures exemplified but is shown for the purposes of illustration.

Figure 2A:
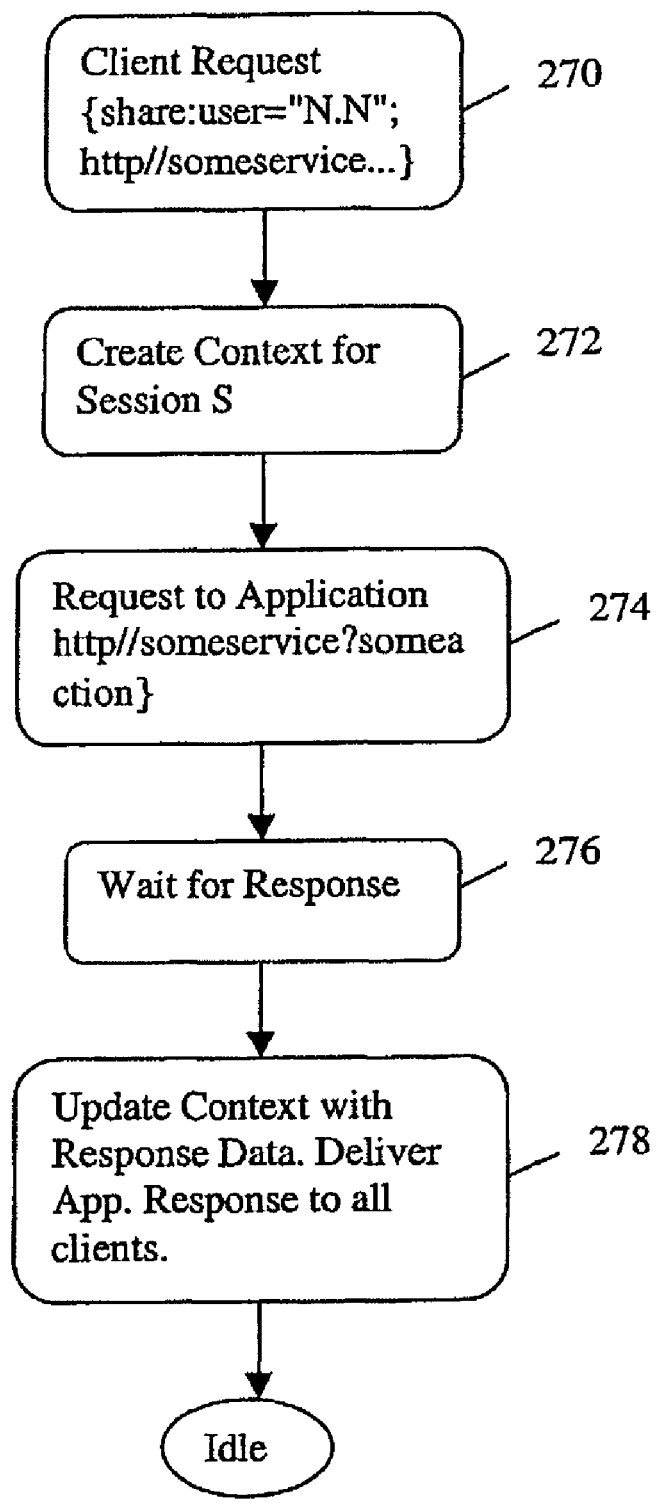
FIG. 2*a* shows a flow diagram from the perspective of the co-browser.

FIG. 2a shows a functional flow diagram from the perspective of the co-browser. A closer look is provided of the states of the co-browser during various interactions with clients and a remote application (service). It should be noted that the URI scheme used herein is merely to illustrate the semantics of the request messages when they are interpreted by the co-browser. In the example, a client requests access to an arbitrary value-added service (http://someservice . . . ) via the WAP gateway whereby the co-browser also identifies that the service is in use by another client, as shown in step 270. In step 272, the co-browser creates context that is a data structure containing the client and service identity, state of the operation, etc. That information enables the co-browser join other clients to the same shared session S on subsequent requests. In step 274, the request is then processed according to normal procedures with the help of the gateway subsystem in the WAP gateway using, for example, an HTTP client, a database connectivity, or Common Object Request Broker Architecture (CORBA) remote procedures. Next we wait for a response from the application, e.g. HTTP 200 OK . . . "somestuff", and synchronize for clients that share the same context, as shown in step 276. The co-browser updates the context and the application response will be delivered to all the clients (by the WAP subsystem), as shown in step 278. From this point, the co-browser is aware of all peers involved in the shared session and knows the current state of that session.

Figure 2B:
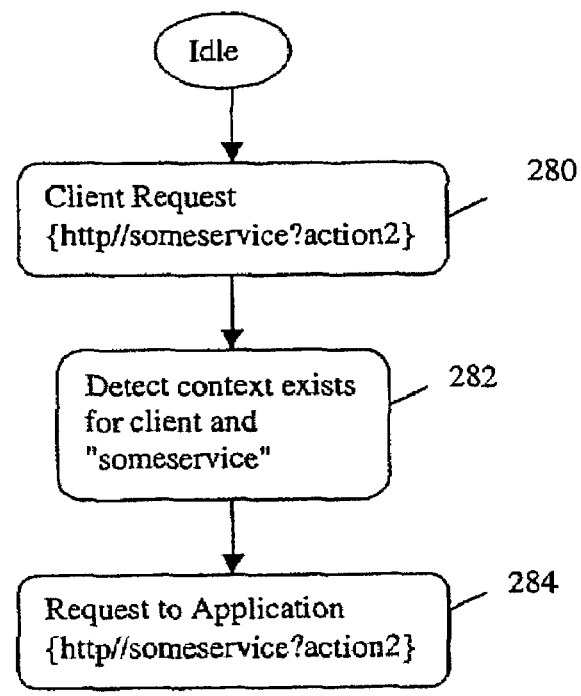
FIG. 2*b* shows a flow diagram of client interaction from the perspective of the co-browser.

FIG. 2b shows a flow diagram of the client continuing to use the service by sending a request, as shown in step 280. Consider a situation where the client authenticates access to the service (the first response being a login screen or equivalent that asks for a password or other credentials required by the application such that widely used on the internet today). The co-browser is able to detect the shared session e.g. by associating the data in the request with the context, as shown in step 282. Such data could be a client identity (a WAP protocol feature) and the service identity (URI) although it should be noted that in practice this could be modeled in a variety of appropriate ways. However, the present invention devises the sharing in a way that does not require modification to the content. This is because the interactions can be detected by basing it on the client sessions e.g. on the WAP standard sessions (or proprietary application sessions) which can be identified with an appropriate co-browser configuration i.e. detecting sessions identifiers encoded in URL:s or cookies, for example, described in HTTP State Management Mechanism, RFC 2109.

When a relationship between the request and a session is detected, the request and the associated response can be tracked by the co-browser. This feature of the co-browser is based on appropriate integration with the gateway subsystem in the WAP gateway. This can be devised in a number of ways starting from a function call context between these software components. In step 284, the request made to the application where the application response is received from the gateway subsystem, the co-browser updates again the context based on this interaction by, among other things, updating the content stored in the context before delivering the response to the client. The co-browser has then updated the state of the shared session.

In the login example, the updated data of the session enables the co-browser to permit other clients use the service, including in the case where they do not authenticate themselves to the application the way the first client did. It is an obvious requirement that the implementation and deployment of the co-browser must ensure that this is not misused and that security of the services are not compromised. It should be noted that the co-browser embodiment described does not permit the passwords or other sensitive information to be seen by the other clients. Although, in some situations it may be advantageous to allow some sensitive information to be shared between the participants such as e.g. a bank provisioning service for a customer with appropriate credentials. As known by those skilled in the art, the levels of security should be devised in accordance with the security requirements for specific applications.

Figure 2C:
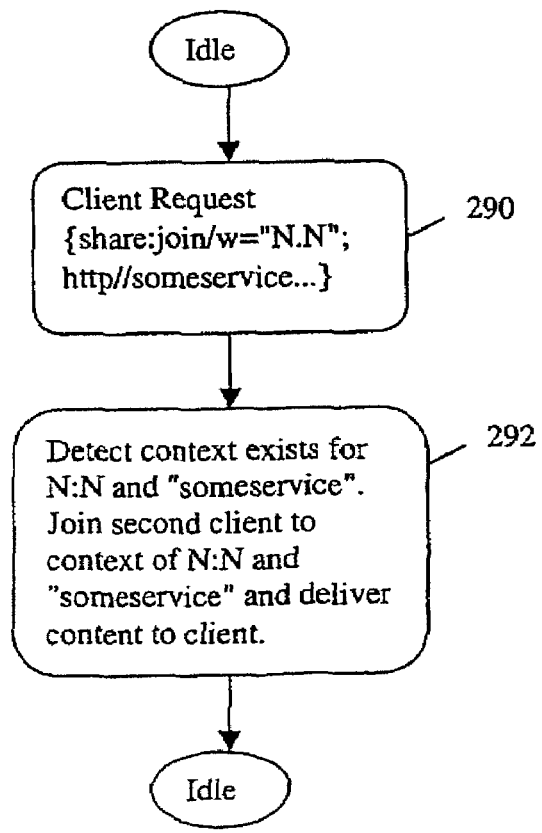
FIG. 2*c* shows a flow diagram of a second client joining the session of a first client from the perspective of the co-browser.

FIG. 2c shows a flow diagram of the situation where a second client joins the session that the a first client has opened, as shown in step 290. It should be noted that the sharing may take place at any point in time and independently from the application logic but it is also possible for the application to determine the share point if so desired. In step 292, the co-browser detects that the second client is requesting to join the session engaged by the first client. The co-browser associates the request with the first client session by using the data stored in the co-context associated with the first client's session. The co-browser joins the second client to the session engaged by the first client by e.g. adding the second client's identity data etc. and updates the context data accordingly. The co-browser then delivers the content stored in the shared session context to the second client i.e. typically with the most recent response message received from the application. Some exceptions to this may depend on certain error messages such as requiring authentication to join this session and informative messages while there is a pending request from another client i.e. the co-browser is waiting a response from the application in the same session and is synchronizing other requests.

For the join request, instead of providing a response to based on stored (most recent) content in the context, the co-browser could send the application request in the same manner as in step 274, and upon response, update the state of the session and deliver the response to all clients sharing that session. In this case the other clients could be notified about the event of joining the client2; the content of the notification would then depend entirely on the application. It should also be noted that the co-browser and/or services may be devised in the most suitable way to notify clients about joining events. Furthermore, ways of attracting clients to join a particular service or session may depend on the specific services and gateway implementations e.g. advertising current E-mail addresses, Web page URLs, and Web broadcast events, such as internationally renowned news outlets.

In an exemplary scenario illustrating the concept of the present invention from a client perspective, a customer using a WAP enabled mobile device may wish to access financial services from a bank, for example. Initial access to the service application typically would occur through normal procedures operating in accordance with WAP. While browsing, the customer may have questions or encounter difficulties and wants a help from a clerk. The help required may involve any range of issues such as e.g. financial consulting, service related assistance for technical problems, or related party issues such as a recipient of payments etc. In the prior art, customers needing this kind of assistance would often make a voice call to a helpdesk assistant at the bank. A resulting problem is that it is often time consuming to describe the precise problem in sufficient detail thereby making it difficult for the assistant to provide swift on-the-spot assistance. For particularly difficult issues, the officer may attempt to recreate the problem, often at a later time, then call the customer back to relay the solution. It would be of great aid if the assistant could directly see the situation at the time that he/she is contacted for help.

Figure 3:
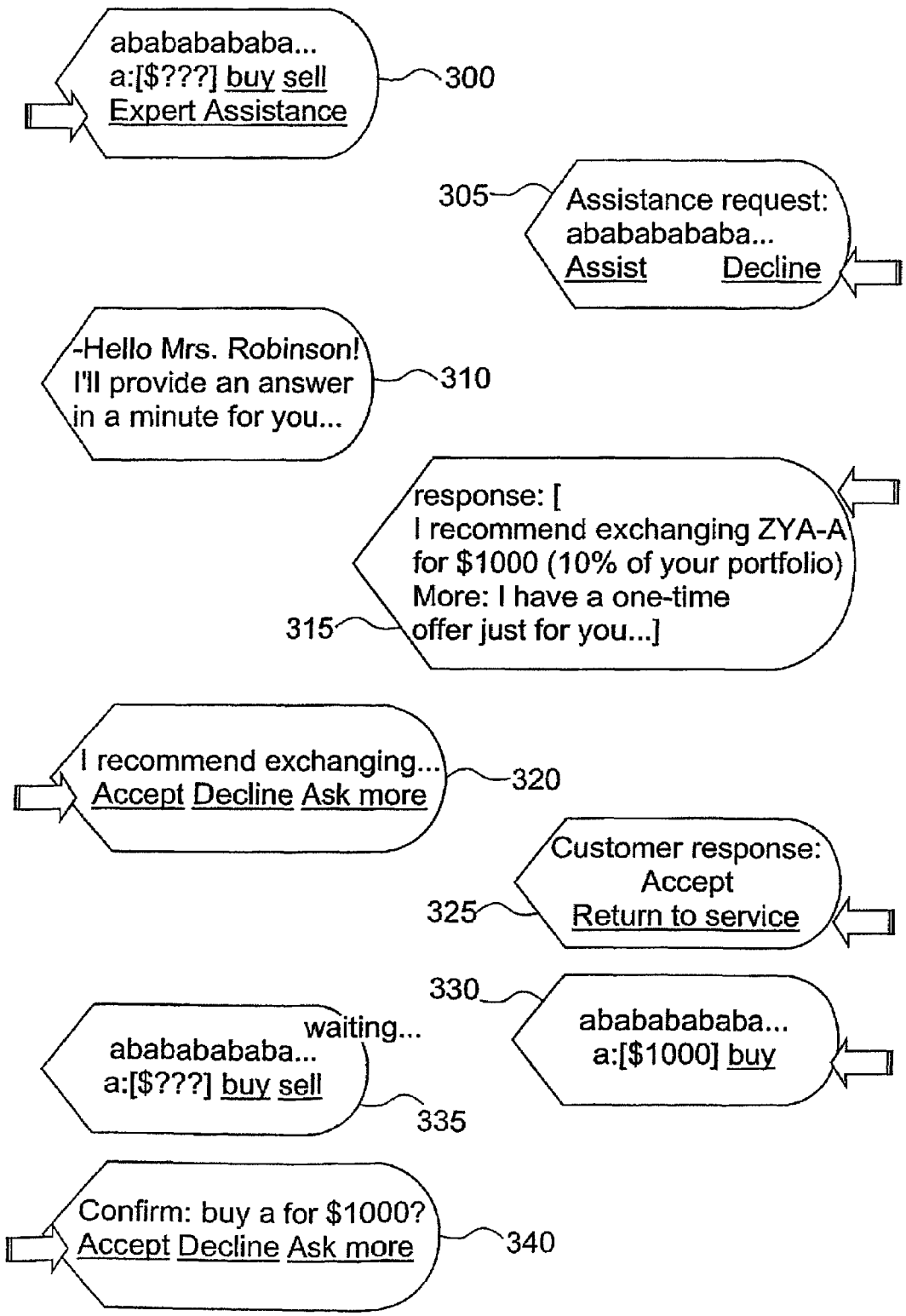
FIG. 3 shows an exemplary shared session exchange in a commercial WAP service application.

FIG. 3 shows an exemplary chronicle of events from the perspectives of the customer and the assistant which illustrate a typical session in a WAP service application. By way of example, a customer browsing the banking financial service application may reach a point where he/she wishes to obtain more in-depth advice on e.g. a stock transaction and thus activates an Expert Assistance option by selecting it from a menu displayed on the client device, as shown in step 300. An affiliate service then notifies an assistant at the bank who reviews the request and may choose to assist or decline, due to his/her suitability to handle the request, as shown in step 305. If the request was declined the affiliate service may try to notify another assistant. It should be noted that the affiliate service is an optional entity that is representative of a system integration and organization that is involved with information such as assistant contacts and associated areas of expertise. Accordingly, the affiliate service is merely described here in facilitating the description of the inventive concept.

When the assistance request is accepted, the customer may then receive a confirmation in the form of a personalised greeting notifying the customer that an assistant is available to help, as shown in step 310. A question regarding a stock transaction is then seen by the assistant and a response comprising advice is entered in step 315. In step 320, the customer enters a response to the stock advice. The customer response is entered via a menu displaying "Accept", or if further investigation is needed a selection of "Ask more" can be selected. Moreover, if no further inquiry is desired the step may be canceled by selecting "Decline." In step 325, when the assistant receives the acceptance from the customer, the assistant prepares and initiates the use of the shared service with the customer by joining the customer's active session. The assistant may then perform actions on behalf of the user such as entering data from calculations representing advice on the stock transaction, as shown in step 330. It should be noted that depending on the application, the assistant may have to take specific actions such as submitting data that may cause the application to update the content which the customer is also able to see by virtue of the co-browser activity, e.g. the entered stock advice for viewing by the customer as shown in step 335. In the final step, the customer may proceed by confirming, declining the response, or inquire on further information, as shown in step 340.

Figure 4:
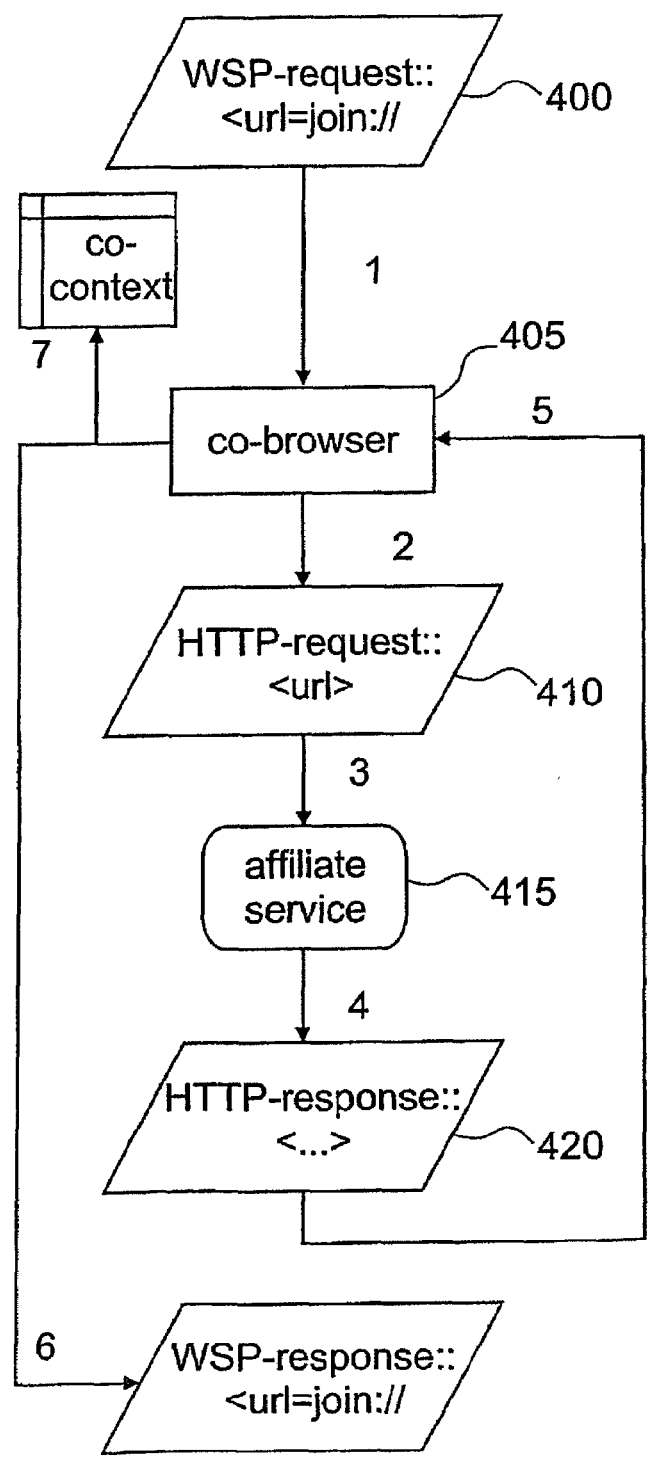
FIG. 4 is a flow diagram illustrating the concept of the join operation.

FIG. 4 is a flow diagram illustrating the process of the join operation for use in the above example. The join operation is initiated by the user agent of the assistant's mobile device typically via a WAP or Wireless Session Protocol (WSP) request, as shown in step 400. The request, when received by the WAP gateway, is analysed by the co-browser by examining the associated join link to determine whether the a shared session should be established, as shown in step 405. The co-browser recognizes the join links by, for example, specifically matching the link to a URI scheme as described earlier. Another technique may include mapping by configuration which involves configuring the WAP gateway so that a specific URI scheme is used to activate the co-browser. This is a gateway implementation specific feature that is available in WAP solutions such as the Nokia WAP Server, for example. As known by those skilled in the art, it is also similar to configuration of servers known as Apache WWW Servers. Still another possible technique includes mapping according to a reserved URI namespace which involves using a standardized URI scheme and implementing the gateway co-browser activity in accordance with the standard.

When it is determined that a shared session should be established, the co-browser invokes the join target by performing the general request process in accordance with normal WAP gateway procedures. This can occur by e.g. submitting a HTTP request in accordance with the URL specified in the join link, as shown in step 410. As shown in step 415, the target is the Affiliate Service in this example. The HTTP response (step 420) is delivered via the co-browser and subsequently to the client user agent in a standard WAP gateway procedure. The shared session is comprised of information, referred to as coordinated context or co-context, associated with the client-service transactions. The term context as used herein generally refers to a document data structure with associated attributes e.g. session references, request and response information etc. Likewise, co-context often includes embedded lexical data and operations such as updating parts of the co-context itself and queries other sessions or other co-contexts from joining actions through the "share:" scheme, for example.

Figure 5:
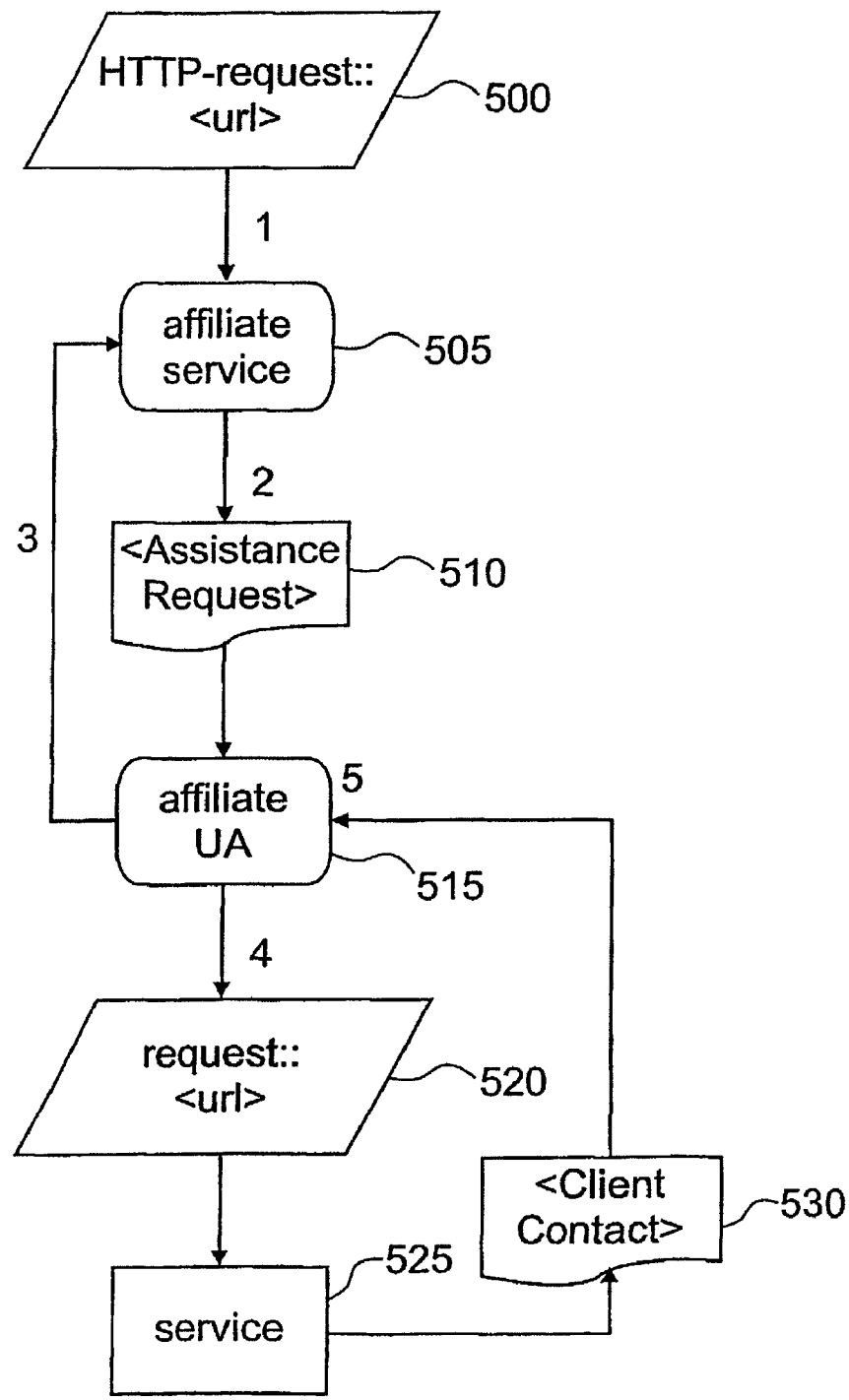
FIG. 5 is a flow diagram illustrating an exemplary joining process by the bank assistant.

FIG. 5 is a flow diagram illustrating an exemplary joining process by the bank assistant. Starting at step 500 with the HTTP request, the transmitted URL similarly targets the Affiliate Service shown in step 505. When the customer asks for assistance, the Affiliate Service invokes another party i.e. the assistant to join the session in the form of an Assistance Request, as shown in step 510. To facilitate this, the assistant uses an User Agent similar to that of the customer. In step 515, the affiliate User Agent obtains necessary information from an Assistance Request (step 520) which includes, for example, the same content the client was viewing when he/she activated the Assistance Request. Additionally, the assistant may also receive some content deemed for official use by bank personnel such as a report of past activity from the service. In step 525, the assistant successfully joins the session and may now participate from the point where the customer requested assistance. The customer may then be notified that the assistant has joined and that the session is now being shared, as shown in step 530. Additional advanced features can be implemented such as sending supplementary messages or even making a voice call to the customer wherein such optional features can be initiated by the co-browser.

Although the invention has been described in some respects with reference to a specified preferred embodiment thereof, variations and modifications will become apparent to those skilled in the art. In particular, the location of the co-browser need not necessarily be located in the gateway and that the co-browser concept need not exist as a separate entity but that the coordinating function represents a process and may be integrated into the software of the system and clients. This is because the essence of the co-browser concept can be portrayed as continuously maintaining the flow of interactive communication while facilitating the joining of clients and individual interactions within an application executing in a wireless data service environment. Furthermore, the invention may be applicable to other types of wireless service models other than those operating in accordance with WAP. It is therefore the intention that the following claims not be given a restrictive interpretation but should be viewed to encompass variations and modifications that are derived from the inventive subject matter disclosed.

The invention claimed is:

1. In a wireless telecommunication system for providing data services to a plurality of mobile clients, wherein said system comprises a gateway and a cooperating coordinating browser, a method of establishing a shared session within a service application in the wireless telecommunication system comprising the steps of:
    establishing an active session with a first client;
    receiving a request from a second client, wherein the second client requesting to join the active session;
    analysing said request from the second client by the coordinating browser;
    joining the second client into the active session with the first client and delivering the current context of the active session to the second client; and
    delivering updated context to the first client and the second client thereby establishing an interactive shared session,
    wherein said analysing step further comprises the coordinating browser determining the engagement status of the application such that when the application requested by the second client is not engaged, a connection with the application is performed in accordance with normal wireless access protocol (WAP) procedures.

2. A method according to claim 1 wherein said data services operate in accordance with Wireless Application Protocol (WAP).

3. A method according to claim 1 wherein said receiving step further includes receiving a join invocation at the second client from the gateway.

4. A method according to claim 1 wherein said analyzing step comprises the coordinating browser analyzing a universal resource identifier (URI) transmitted with the join request.

5. A method according to claim 2 wherein said data services are hosted on a service associated with the gateway.

6. A wireless telecommunication system for providing data services residing on host servers to a plurality of mobile clients, wherein the wireless telecommunication system comprises a gateway for having wireless communication with said mobile clients, characterised in that
    the system comprises a coordinating browser functioning together with said gateway, wherein the browser being configured for establishing a shared session between at least two of said mobile clients for use in interacting within a service application, and wherein updated context by any mobile client can be delivered to all mobile clients in the shared session,
    wherein coordinating browser is further configured to determine the engagement status of the application such that when the application requested by one of the at least two mobile clients is not engaged, a connection with the application is performed in accordance with normal wireless access protocol (WAP) procedures.

7. A system according to claim 6 characterised in that the data services operate in accordance with the wireless access protocol (WAP).

8. A system according to claim 7 characterised in that the gateway is a WAP gateway server for hosting WAP content and providing WAP-based service applications.

9. A system according to claim 7 characterised in that the coordinating browser is a software-based function residing in the gateway.

10. A system according to claim 7 characterised in that the context viewed by the mobile clients is in Wireless Markup Language (WML) format.

11. A computer readable storage medium having a stored computer program product comprising:
    computer executable instructions for causing a wireless telecommunication gateway to provide wireless data services to a plurality of mobile clients; and
    computer executable instructions for causing said gateway to operate together with a coordinating browser to establish a shared session between at least two of said mobile clients within a service application, and wherein updated context by any mobile client can be delivered to all mobile clients in the shared session; and
    computer executable instructions for determining the engagement status of the application such that when the application requested by a mobile client is not engaged, a connection with the application is performed in accordance with normal wireless access protocol (WAP) procedures.

12. A wireless gateway operating in a wireless telecommunication system in order to provide wireless data services to a plurality of mobile clients, characterised in that
    the gateway comprises a coordinating browser which cooperates to establish a shared session between at least two mobile clients within a wireless service application, and wherein updated context by any mobile client can be delivered to all mobile clients in the shared session,
    wherein coordinating browser is further configured to determine the engagement status of the application such that when the application requested by one of the at least two mobile clients is not engaged, a connection with the application is performed in accordance with normal wireless access protocol (WAP) procedures.

13. A wireless gateway according to claim 12 characterised in that the gateway functionality is implemented on a computer server.

* * * * *